(12) United States Patent
Igarashi et al.

(10) Patent No.: US 11,512,424 B2
(45) Date of Patent: Nov. 29, 2022

(54) CARBON FIBER AND METHOD OF MANUFACTURING SAME

(71) Applicant: SHOWA DENKO K.K., Tokyo (JP)

(72) Inventors: Takeshi Igarashi, Tokyo (JP); Tomoyuki Takei, Tokyo (JP); Yu Gao, Tokyo (JP); Masumi Kuritani, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 189 days.

(21) Appl. No.: 16/757,863

(22) PCT Filed: Oct. 17, 2018

(86) PCT No.: PCT/JP2018/038620
§ 371 (c)(1),
(2) Date: Apr. 21, 2020

(87) PCT Pub. No.: WO2019/082755
PCT Pub. Date: May 2, 2019

(65) Prior Publication Data
US 2021/0062409 A1  Mar. 4, 2021

(30) Foreign Application Priority Data
Oct. 27, 2017  (JP) .............................. JP2017-208033

(51) Int. Cl.
*D06M 11/74* (2006.01)
*C01B 32/05* (2017.01)
*C08J 5/06* (2006.01)
*D06M 101/40* (2006.01)

(52) U.S. Cl.
CPC ............ *D06M 11/74* (2013.01); *C01B 32/05* (2017.08); *C08J 5/06* (2013.01); *D06M 2101/40* (2013.01)

(58) Field of Classification Search
CPC ...... C08J 5/06; D06M 11/74; D06M 2101/40; D06M 23/10; D06M 10/00; C08K 9/02; C08K 3/045; C09K 9/02; Y10S 977/734; Y10S 977/735; B82Y 30/00; H01L 51/0046; C09C 1/144; C22C 2026/001; C07C 2604/00
USPC ............... 977/734, 890, 500, 510; 252/502; 264/105; 423/445 B
See application file for complete search history.

(56) References Cited

U.S. PATENT DOCUMENTS

| | | |
|---|---|---|
| 9,087,995 B2 | 7/2015 | Virkar et al. |
| 2008/0089827 A1 | 4/2008 | Miyazawa et al. |
| 2009/0176112 A1 | 7/2009 | Kruckenberg et al. |
| 2011/0001086 A1 | 1/2011 | Kruckenberg et al. |
| 2011/0204319 A1 | 8/2011 | Virkar et al. |
| 2011/0204330 A1 | 8/2011 | LeMieux et al. |
| 2011/0223339 A1 | 9/2011 | Furukawa et al. |
| 2014/0001437 A1 | 1/2014 | LeMieux et al. |
| 2016/0265143 A1 | 9/2016 | Garnier |
| 2017/0314188 A1 | 11/2017 | Komukai et al. |
| 2020/0299582 A1 | 9/2020 | Komatsu |

FOREIGN PATENT DOCUMENTS

| | | |
|---|---|---|
| EP | 527035 | 2/1993 |
| JP | H05-116925 | 5/1993 |
| JP | 2005-035809 | 2/2005 |
| JP | 2005-263617 | 9/2005 |
| JP | 2008-230912 | 10/2008 |
| JP | 2009-535530 | 10/2009 |
| JP | 2010-137155 | 6/2010 |
| JP | 2013-518439 | 5/2013 |
| JP | 2016-060969 | 4/2016 |
| RU | 2523438 | * 7/2014 |
| RU | 2523483 | 7/2014 |
| WO | 2016/063809 | 4/2016 |
| WO | 2019/087965 | 5/2019 |

OTHER PUBLICATIONS

American Elements, Fullerene Soot, accessed online Feb. 1, 2022.*
Ogasawara et al., Mechanical properties of carbon fiber/fullerene-dispersed epoxy composite, Composites Science Technology, vol. 69, Issues 11-12, Sep. 2009, pp. 2002-2007.*
Urvanov Sergey Alekseyevich et al., Carbon Fiber Modified with Carbon Nanotubes and Fullerenes for Fibrous Composite Application, Journal of Materials Science and Engineering A, Nov. 10, 13, vol. 11, pp. 725-731.
International Search Report for PCT/JP2018/038625 dated Nov. 27, 2018.
International Search Report for PCT/JP2018/038633 dated Nov. 27, 2018.
International Search Report for PCT/JP2018/038620 dated Nov. 27, 2018.
Office Action dated Jun. 14, 2022 with respect to the related U.S. Appl. No. 16/756,250.
Office Action dated Jun. 22, 2022 with respect to the related U.S. Appl. No. 16/757,861.

* cited by examiner

*Primary Examiner* — Camie S Thompson
(74) *Attorney, Agent, or Firm* — IPUSA, PLLC

(57) ABSTRACT

A carbon fiber is obtained by sequentially performing: a step (I) of dissolving a fullerene mixture including fullerenes $C_{60}$ and $C_{70}$ in an organic solvent to prepare a fullerene solution; a step (II) of immersing a material carbon fiber in the fullerene solution; and a step (III) of extracting the carbon fiber from the fullerene solution and drying the extracted carbon fiber.

12 Claims, No Drawings

CARBON FIBER AND METHOD OF MANUFACTURING SAME

TECHNICAL FIELD

The present invention relates to a carbon fiber and a method of manufacturing the same.

BACKGROUND ART

Non-patent Document 1 discloses immersing a carbon fiber in a toluene solution of fullerene $C_{60}$ and thereafter drying it to obtain a carbon fiber with fullerene $C_{60}$ attached to the surface.

Patent Document 1 discloses a method of fullerene treatment of a carbon film surface by applying, with a brush or a spray, a dispersion liquid of isopropyl alcohol, in which fullerenes are dispersed, to a carbon film and then drying.

PRIOR ART DOCUMENT

Patent Document

[Patent Document 1] Japanese Laid-open Patent Publication No. 2010-137155

Non-Patent Document

[Non-Patent Document 1] Journal of Materials Science and Engineering A, 2013, 3(11), 725-731. 'Carbon Fiber Modified with Carbon Nanotubes and Fullerenes for Fibrous Composite Application'

SUMMARY OF THE INVENTION

Problem to be Solved by the Invention

However, in the method of Non-Patent Document 1, when the solvent evaporates from the carbon fiber, the aggregated and deposited fullerene is only unevenly attached to the carbon fiber surface, and the amount of fullerene attached to the carbon fiber is equal to the amount of fullerene dissolved in the solvent attached to the carbon fiber. Because the interaction between the deposited fullerene and the carbon fiber is small, when the carbon fiber is added as a reinforcing agent to resin, there is a problem that the effect of enhancing the interfacial shear strength between the carbon fiber and the resin is not sufficiently achieved. Also, in the method of Patent Document 1, fullerene is aggregated without being dissolved in a solvent, and thus the fullerene is only unevenly attached to the carbon fiber surface. Therefore, the effect of enhancing the interfacial shear strength between the fullerene and resin is insufficient.

In view of the above, the present invention has an object to provide a carbon fiber with fullerene adsorbed on the surface and a method of manufacturing the same.

Means for Solving the Problem

The inventors of the present invention have found that fullerenes $C_{60}$ and $C_{70}$ adsorb on a carbon fiber under specific conditions. The inventors also have found that the carbon fiber have a higher interfacial shear strength with a resin than that of a carbon fiber on which fullerene is simply attached to the surface.

That is, the present invention provides the following in order to solve the above problems.

[1] A carbon fiber on which fullerenes $C_{60}$ and $C_{70}$ adsorb.

[2] The carbon fiber according to [1], wherein the fullerenes $C_{60}$ and $C_{70}$ adsorb, as a total amount, by 0.001 parts by mass to 1 part by mass per 1000 parts by mass of the carbon fiber.

[3] A method of manufacturing a carbon fiber on which fullerenes $C_{60}$ and $C_{70}$ adsorb sequentially performing:

a step (I) of dissolving a fullerene mixture including fullerenes $C_{60}$ and $C_{70}$ in an organic solvent to prepare a fullerene solution;

a step (II) of immersing a material carbon fiber in the fullerene solution; and a step (III) of extracting the carbon fiber from the fullerene solution and drying the extracted carbon fiber.

[4] The method of manufacturing the carbon fiber according to [3], wherein the fullerene mixture is a mixture containing 50% by mass to 90% by mass of $C_{60}$ and 10% by mass to 50% by mass of $C_{70}$.

[5] The method of manufacturing the carbon fiber according to [3] or [4], wherein a total concentration of the fullerenes $C_{60}$ and $C_{70}$ in the fullerene solution is 1 ppm by mass to 1000 ppm by mass.

[6] The method of manufacturing the carbon fiber according to any one of [3] to [5], wherein the organic solvent is an alkyl halide.

[7] The method of manufacturing the carbon fiber according to any one of [3] to [6], wherein the material carbon fiber is a polyacrylonitrile-based carbon fiber.

[8] The method of manufacturing the carbon fiber according to any one of [3] to [7], wherein a time of immersing the material carbon fiber in the step (II) is 5 seconds to 24 hours.

[9] The method of manufacturing the carbon fiber according to any one of [3] to [8], wherein a temperature of the solution during immersion in the step (II) is 10° C. to 60° C.

Effect of the Invention

According to the present invention, it is possible to obtain a carbon fiber having a high interfacial shear strength with resin.

EMBODIMENT FOR CARRYING OUT THE INVENTION

In the following, one embodiment will be described in detail. However, the present invention is not limited thereto, and can be implemented without departing from the scope of the present invention.

<Carbon Fiber>

A carbon fiber on which fullerenes $C_{60}$ and $C_{70}$ adsorb according to the present embodiment is obtained by sequentially performing: a step (I) of dissolving fullerenes $C_{60}$ and $C_{70}$ in an organic solvent to prepare a fullerene solution; a step (II) of immersing a material carbon fiber (which is a carbon fiber on which fullerenes do not adsorb) in the fullerene solution; and a step (III) of extracting the carbon fiber from the fullerene solution and drying the extracted carbon fiber.

Here, when performing the step (II), after immersing the material carbon fiber, the concentration of fullerenes $C_{60}$ and $C_{70}$ in the solution decreases in comparison to the concentration before the immersion. This is also the result of adsorption of fullerenes $C_{60}$ and $C_{70}$ in the solution to the carbon fiber and an increase in the concentration of fullerenes $C_{60}$ and $C_{70}$ on the surface of the carbon fiber. The concentration of fullerenes $C_{60}$ and $C_{70}$ in the solution does not change simply by attachment as in Non-Patent Document 1 or Patent Document 1. Therefore, when the concentration of fullerene in the solution decreases, it is determined that the fullerene is adsorbed on the material carbon fiber, and when a decrease in the concentration is not observed, it is determined that fullerene is not adsorbed. It should be noted that the fullerene concentration in the solution is measured by a "method of measuring fullerene adsorption amount on carbon fiber", which will be described later below in Examples.

Here, the total adsorption amount (parts by mass) of fullerenes $C_{60}$ and $C_{70}$ per 1000 parts by mass of carbon fiber is calculated by the following formula (1).

$$\text{Adsorption amount} = ([\text{Total concentration of fullerenes } C_{60} \text{ and } C_{70} \text{ in fullerene solution before adsorption (ppm by mass)}] - [\text{Total concentration of fullerenes } C_{60} \text{ and } C_{70} \text{ in fullerene solution after adsorption (ppm by mass)}]) \times [\text{Mass of fullerene solution (g)}]/[\text{Mass of carbon fiber (mg)}] \quad (1)$$

Per 1000 parts by mass of the carbon fiber, the total adsorption amount of the fullerenes $C_{60}$ and $C_{70}$ is preferably 0.001 parts by mass to 1 part by mass, is more preferably 0.005 parts by mass to 0.5 parts by mass, and is further more preferably 0.01 parts by mass to 0.3 parts by mass. When the adsorption amount is in this range, it is sufficiently easy to obtain the effect of enhancing the interfacial shear strength with resin.

Next, a method of manufacturing a carbon fiber on which fullerenes $C_{60}$ and $C_{70}$ adsorb will be described.

<Step (I)>

In the step (I), a fullerene mixture is dissolved in an organic solvent to prepare a fullerene solution.

The composition of the fullerene mixture contains $C_{60}$ and $C_{70}$, and preferably contains 50% by mass to 90% by mass of $C_{60}$ and 10% by mass to 50% by mass of $C_{70}$. Also, the content of fullerene higher than $C_{70}$ is preferably less than or equal to 40% by mass (if included). By using such a fullerene mixture, the fullerenes $C_{60}$ and $C_{70}$ are easily adsorbed in the step (II) which will described later below.

The total concentration of the fullerenes $C_{60}$ and $C_{70}$ in the solution in the step (I) is preferably 1 ppm by mass to 1000 ppm by mass, is more preferably 10 ppm by mass to 500 ppm by mass, and is more preferably 10 ppm by mass to 300 ppm by mass. When, the concentration is greater than or equal to the lower limit of this range, fullerenes $C_{60}$ and $C_{70}$ are easily adsorbed. When the concentration is less than or equal to the upper limit of this range, the solution is easily prepared and it is economically advantageous.

The organic solvent in the step (I) is a solvent that dissolves fullerenes, is preferably an alkyl halide, is more preferably dichloromethane, chloroform, or carbon tetrachloride, and is further more preferably dichloromethane. By using such a solvent, fullerenes $C_{60}$ and $C_{70}$ are easily adsorbed.

<Step (II)>

In the step (II), a material carbon fiber is immersed in the fullerene solution. As the material carbon fiber used in the step (II), either a pitch-based carbon fiber or a polyacrylonitrile-based carbon fiber can be used, and a polyacrylonitrile-based carbon fiber is preferable. Such a material carbon fiber is generally used as a reinforcing agent for a carbon fiber reinforced plastic or the like, and is often desired to have a high interfacial shear strength with resin.

The time of immersing the carbon fiber in the step (II) is preferably 5 seconds to 24 hours, is more preferably 5 minutes to 12 hours, and is further more preferably 30 minutes to 2 hours. When the time is greater than or equal to the lower limit of this range, fullerenes $C_{60}$ and $C_{70}$ are easily adsorbed. Although the immersion may be performed for a further long time, the adsorption amount does not easily increase. Therefore, when the time is less than or equal to the upper limit of this range, the processing time is short, which is economically advantageous.

Although the fullerene solution may be used without particularly being cooled or warmed at the time of immersion in the step (II), the temperature of the fullerene solution is preferably 10° C. to 60° C., is more preferably 15° C. to 60° C., and is further more preferably 20° C. to 40° C. Within this range, fullerenes $C_{60}$ and $C_{70}$ are easily adsorbed and the energy of cooling or heating is small, which is economical.

<Step III>

In the step (III), the carbon fiber is extracted from the fullerene solution of the step (II) and the extracted carbon fiber is dried. The method of extracting the carbon fiber is not particularly limited, but filtration is preferable because the carbon fiber and the fullerene solution are easily separated. The drying may be performed by heating, decompression, air drying, or the like to an extent that the residual solvent of the step (II) is removed from the surface of the carbon fiber, and is not particularly limited.

Here, the fullerene remaining on the carbon fiber deposited from the solvent remaining on the carbon fiber surface at the time of drying, which is not fullerene adsorbed on the carbon fiber, is referred to as "the fullerene attached to the carbon fiber".

Because the fullerene attached to the carbon fiber is not as effective as the fullerene adsorbed on the carbon fiber, the carbon fiber may be washed with an organic solvent to recover the fullerene before the drying so that the fullerene attached to the carbon fiber is reduced. The organic solvent used for washing is preferably the solvent used for the fullerene solution in the step (I). In this case, the solution of fullerene recovered as the washing liquid can be reused as the fullerene solution in the step (I) by adjusting the concentrations of the fullerenes $C_{60}$ and $C_{70}$, through concentration or adding and dissolving the fullerenes $C_{60}$ and $C_{70}$.

<Use>

A carbon fiber according to the present embodiment has a high interfacial shear strength with resin and thus is preferably used for a carbon fiber reinforced plastic.

EXAMPLES

In the following, the present invention will be described in more detail with reference to Examples and Comparative Examples.

However, the present invention is not limited to Examples below.

Examples 1-2 and Comparative Examples 1-2

Using fullerene described in Table 1, in 10 g of a solution prepared by dissolving the fullerene in dichloromethane as a solvent (fullerene concentration is 10 ppm by mass, in a case of a fullerene mixture, total concentration of respective fullerenes), 100 mg of a carbon fiber (carbon fiber tow PYROFIL™ TR50S12L manufactured by Mitsubishi Rayon Co., Ltd.) from which sizing agent has been removed in advance with dichloromethane was immersed at room temperature (approximately 20° C.) for a time period described in Table 1. The solution and the carbon fiber were separated by filtration, and the solution was used for fullerene adsorption measurement. After air drying, the carbon fiber was used for an interfacial shear strength test.

<Method of Measuring Fullerene Adsorption Amount on Carbon Fiber>

For each of Examples and Comparative Examples, by high-performance liquid chromatography (device: high-performance liquid chromatography 1200 Series manufactured by Agilent Technology; column: column YMC-pack ODS-AM manufactured by YMC Co., Ltd.; developing solvent (volume ratio): toluene/methanol=51/49; flow rate: 1.2 mL/min; detection method: 308 nm ultraviolet light absorption) for which a calibration curve was created in advance with a toluene solution for each of fullerenes $C_{60}$ or $C_{70}$, the concentrations of $C_{60}$ and $C_{70}$ in the fullerene solution before and after carbon fiber immersion was measured to calculate the adsorption amounts of the fullerenes on the carbon fiber according to the above-described formula (1).

<Interfacial Shear Strength Test>

For each of Examples and Comparative Examples, the interfacial shear strength was evaluated by a microdroplet test using a composite material interface property evaluation apparatus model HM410 manufactured by Toei Sangyo Co., Ltd. The microdroplet test was conducted on the carbon fiber obtained from the fullerene adsorption experiment on the carbon fiber using the carbon fiber obtained by each of Examples and Comparative Examples as a sample, (resin: PEEK 450G manufactured by Victrex plc; temperature: room temperature; atmosphere: air atmosphere; pulling rate: 0.12 mm/min). Each sample was measured 5 times and the average value was adopted.

TABLE 1

|  | FULLERENE | IMMERSION TIME (h) | FULLERENE ADSORPTION AMOUNT PER 1000 PARTS BY MASS OF CARBON FIBER (PARTS BY MASS) | INTERFACIAL SHEAR STRENGTH (MPa) |
|---|---|---|---|---|
| Example 1 | FULLERENE MIXTURE | 24 | $C_{60}$: 0.008 $C_{70}$: 0.005 TOTAL: 0.013 | 112.7 |
| Example 2 | FULLERENE MIXTURE | 2 | $C_{60}$: 0.007 $C_{70}$: 0.004 TOTAL: 0.011 | 111.9 |
| Comparative Example 1 | FULLERENE $C_{60}$ | 24 | 0.000 | 105.6 |
| Comparative Example 2 | FULLERENE $C_{70}$ | 24 | 0.004 | 110.5 |

Fullerene mixture: Nanom™ mix ST ($C_{60}$: 60% by mass, $C_{70}$: 25% by mass, fullerene higher than $C_{70}$: 15% by mass) manufactured by Frontier Carbon Corporation Fullerene $C_{60}$: Nanom™ purple SUH manufactured by Frontier Carbon Corporation Fullerene $C_{70}$: Nanom™ orange SU manufactured by Frontier Carbon Corporation As indicated in Table 1, upon using a fullerene mixture, $C_{60}$, which was not adsorbed when used alone, could be adsorbed on the carbon fiber, and the total adsorption amount of $C_{60}$ and $C_{70}$ was greater than that when $C_{70}$ was used alone. In addition, the interfacial shear strength also increased.

The present application is based on and claims priority to Japanese Patent Application No. 2017-208033, filed on Oct. 27, 2017, the entire contents of which are hereby incorporated herein by reference.

The invention claimed is:

1. A method of manufacturing a carbon fiber having fullerenes $C_{60}$ and $C_{70}$ adsorbed thereon, the method comprising sequentially performing:

dissolving a fullerene mixture including fullerenes $C_{60}$ and $C_{70}$ in an organic solvent to prepare a fullerene solution;

immersing a material carbon fiber in the fullerene solution; and extracting the carbon fiber from the fullerene solution and drying the extracted carbon fiber, wherein the fullerene mixture is a mixture containing 50% by mass to 90% by mass of $C_{60}$ and 10% by mass to 50% by mass of $C_{70}$.

2. The method of manufacturing the carbon fiber according to claim 1, wherein the material carbon fiber is a polyacrylonitrile-based carbon fiber.

3. The method of manufacturing the carbon fiber according to claim 1, a time of immersing the material carbon fiber is 5 seconds to 24 hours.

4. A method of manufacturing a carbon fiber having fullerenes $C_{60}$ and $C_{70}$ adsorbed thereon, the method comprising sequentially performing:

dissolving a fullerene mixture including fullerenes $C_{60}$ and $C_{70}$ in an organic solvent to prepare a fullerene solution;

immersing a material carbon fiber in the fullerene solution; and extracting the carbon fiber from the fullerene solution and drying the extracted carbon fiber, wherein a total concentration of the fullerenes $C_{60}$ and $C_{70}$ in the fullerene solution is 1 ppm by mass to 1000 ppm by mass.

5. The method of manufacturing the carbon fiber according to claim 4, wherein the material carbon fiber is a polyacrylonitrile-based carbon fiber.

6. The method of manufacturing the carbon fiber according to claim 4, a time of immersing the material carbon fiber is 5 seconds to 24 hours.

7. A method of manufacturing a carbon fiber having fullerenes $C_{60}$ and $C_{70}$ adsorbed thereon, the method comprising sequentially performing:

dissolving a fullerene mixture including fullerenes $C_{60}$ and $C_{70}$ in an organic solvent to prepare a fullerene solution;

immersing a material carbon fiber in the fullerene solution; and extracting the carbon fiber from the fullerene solution and drying the extracted carbon fiber, wherein the organic solvent is an alkyl halide.

8. The method of manufacturing the carbon fiber according to claim 7, wherein the material carbon fiber is a polyacrylonitrile-based carbon fiber.

9. The method of manufacturing the carbon fiber according to claim 7, a time of immersing the material carbon fiber is 5 seconds to 24 hours.

10. A method of manufacturing a carbon fiber having fullerenes $C_{60}$ and $C_{70}$ adsorbed thereon, the method comprising sequentially performing:
- dissolving a fullerene mixture including fullerenes $C_{60}$ and $C_{70}$ in an organic solvent to prepare a fullerene solution;
- immersing a material carbon fiber in the fullerene solution; and
- extracting the carbon fiber from the fullerene solution and drying the extracted carbon fiber,
- wherein a temperature of the solution during the immersing of the material carbon fiber is 10° C. to 60° C.

11. The method of manufacturing the carbon fiber according to claim 10, wherein the material carbon fiber is a polyacrylonitrile-based carbon fiber.

12. The method of manufacturing the carbon fiber according to claim 10, a time of immersing the material carbon fiber is 5 seconds to 24 hours.

* * * * *